US012783876B2

(12) United States Patent
Piazentin Ono et al.

(10) Patent No.: US 12,783,876 B2
(45) Date of Patent: Nov. 3, 2026

(54) SYSTEM AND METHOD FOR EFFICIENT ANALYZING AND COMPARING SLICE-BASED MACHINE LEARN MODELS

(71) Applicant: Robert Bosch GmbH, Stuttgart (DE)

(72) Inventors: Jorge Henrique Piazentin Ono, Sunnyvale, CA (US); Xiaoyu Zhang, Davis, CA (US); Liang Gou, San Jose, CA (US); Liu Ren, Saratoga, CA (US)

(73) Assignee: Robert Bosch GmbH (DE)

( * ) Notice: Subject to any disclaimer, the term of this patent is extended or adjusted under 35 U.S.C. 154(b) by 965 days.

(21) Appl. No.: 17/966,794

(22) Filed: Oct. 15, 2022

(65) Prior Publication Data

US 2024/0135160 A1 Apr. 25, 2024

(51) Int. Cl.
*G06N 3/08* (2023.01)
*G06F 18/21* (2023.01)
*G06N 3/045* (2023.01)

(52) U.S. Cl.
CPC ............ *G06N 3/08* (2013.01); *G06F 18/217* (2023.01); *G06N 3/045* (2023.01)

(58) Field of Classification Search
CPC .... G06N 3/08; G06N 3/0455; G06F 18/2148; G06F 18/217

(Continued)

(56) References Cited

U.S. PATENT DOCUMENTS 11,651,602 B1 5/2023 Tschernezki et al.
12,111,885 B2 10/2024 Jaiswal et al.

(Continued)

OTHER PUBLICATIONS

Eliana Pastor et al., "Looking for trouble: Analyzing classifier behavior via pattern divergence." In Proceedings of the 2021 International Conference on Management of Data, SIGMOD '21, Jun. 20-25, 2021, Virtual Event, China, 13 Pages.

(Continued)

*Primary Examiner* — Hung T Vy
(74) *Attorney, Agent, or Firm* — Dickinson Wright PLLC

(57) ABSTRACT

A computer-implemented method for a machine-learning network that includes receiving an input dataset, sending the input dataset to a first machine-learning model to output predictions associated with the input data, identifying one or more slices associated with the input dataset and a first machine learning model in a first iteration, wherein each of the one or more slices include input data from the input dataset and common attributes associated with each slice; upon selecting one or more slices of the input dataset, training a shallow regressor model configured to predict residuals associated with the model, create a representation associated with a ground-truth label and a second representation associated with a model prediction associated with each sample associated with each of the one or more slices, determine residuals associated with every prediction of the first machine learning model, training the shallow regressor to compute one or more predicted residuals of the selected slices, generate an optimized model the predicted residuals, determine a modified accuracy of optimized predictions from the optimized model on each of the one or more slices of the input dataset, determine a modified effect of each of the one or more slices by utilizing a difference between the modified accuracy and an original accuracy associated with the first machine learning model, and output the modified effect to a graphical interface.

20 Claims, 10 Drawing Sheets

(58) Field of Classification Search
USPC .......................................................... 706/15
See application file for complete search history.

(56) References Cited

U.S. PATENT DOCUMENTS

| | | | | |
|---|---|---|---|---|
| 12,277,406 | B2 | 4/2025 | Edelsten et al. | |
| 2018/0204111 | A1 | 7/2018 | Zadeh et al. | |
| 2018/0293483 | A1* | 10/2018 | Abramson | H04L 51/02 |
| 2020/0184278 | A1 | 6/2020 | Zadeh et al. | |
| 2020/0410157 | A1* | 12/2020 | van de Kerkhof | G06F 40/166 |
| 2022/0092407 | A1 | 3/2022 | Chen et al. | |
| 2023/0237787 | A1 | 7/2023 | Olaleye et al. | |
| 2024/0029409 | A1* | 1/2024 | Aidt | G06V 10/22 |
| 2024/0177464 | A1 | 5/2024 | Kim et al. | |

OTHER PUBLICATIONS

Jiawei Han et al., "Frequent pattern mining: current status and future directions." Data mining and knowledge discovery 2007, vol. 15, No. 1, pp. 55-86.
Shiori Sagawa et al., "Distributionally Robust Neural Networks for Group Shifts: On the Importance of Regularization for Worst-Case Generalization." Published as a conference paper at ICLR 2020, 19 Pages.
Yonatan Oren et al., "Distributionally Robust Language Modeling." arXiv:1909.02060v1 [cs.CL] Sep. 4, 2019, 11 Pages.
Samuel Ackerman et al., "FreaAI: Automated extraction of data slices to test machine learning models." arXiv:2108.05620v1 [cs. LG] Aug. 12, 2021, 9 Pages.
Edo Liberty et al., "Elastic Machine Learning Algorithms in Amazon SageMaker." Proceedings of the 2020 ACM SIGMOD International Conference on Management of Data, 2020, pp. 731-737.
Karan Goel et al., "RobustnessGym: Unifying the NLP Evaluation Landscape." arXiv:2101.04840v1 [cs.CL] Jan. 13, 2021, 34 Pages.
Sebastian Lapuschkin et al., "Unmasking Clever Hans predictors and assessing what machines really learn." Nature Communications 2019, vol. 10, Article No. 1096, 8 Pages.
Vaishnavh Nagarajan et al., "Understanding the Failure Modes of Out-of-Distribution Generalization." arXiv:2010.15775v1 [cs.LG] Oct. 29, 2020, 31 Pages.
Yaroslav Ganin et al., "Unsupervised Domain Adaptation by Backpropagation." Proceedings of the 32nd International Conference on Machine Learning, Lille, France, 2015. JMLR: W&CP vol. 37, 10 Pages.
John Miller et al., "Accuracy on the Line: On the Strong Correlation Between Out-of-Distribution and In-Distribution Generalization." Proceedings of the 38th International Conference on Machine Learning, PMLR 139, 2021, 15 Pages.
Weihua Hu et al., "Does Distributionally Robust Supervised Learning Give Robust Classifiers?" Proceedings of the 35th International Conference on Machine Learning, Stockholm, Sweden, PMLR 80, 2018, 9 Pages.
Maria Cristina Ferreira de Oliveira et al., "From Visual Data Exploration to Visual Data Mining: A Survey?" IEEE Transactions On Visualization and Computer Graphics, vol. 9, No. 3, JULY-Sep. 2003, pp. 378-394.
Daniel A. Keim, "Information Visualization and Visual Data Mining." IEEE Transactions On Visualization and Computer Graphics, vol. 7, No. 1, JANUARY-Mar. 2002, pp. 100-107.
Tongshuang Wu et al., "Errudite: Scalable, Reproducible, and Testable Error Analysis." Proceedings of the 57th Annual Meeting of the Association for Computational Linguistics, pp. 747-763, Florence, Italy, Jul. 28 - Aug. 2, 2019.
Alexander Lex et al., "UpSet: Visualization of Intersecting Sets." IEEE Transactions On Visualization and Computer Graphics, vol. 20, No. 12, Dec. 2014, pp. 1983-1992.
Tianqi Chen et al., "XGBoost: A Scalable Tree Boosting System." KDD '16: Proceedings of the 22nd Acm Sigkdd International Conference on Knowledge Discovery and Data Mining Aug. 2016, pp. 785-794.
Vincent S. Chen et al., "Slice-based Learning: A Programming Model for Residual Learning in Critical Data Slices." 33rd Conference on Neural Information Processing Systems (NeurIPS 2019), 11 Pages.
Dennis Collaris et al., "StrategyAtlas: Strategy Analysis for Machine Learning Interpretability." Journal Ofieee Transactions On Visualization and Computer Graphics 2021, 13 Pages.
Dennis Collaris et al., "ExplainExplore: Visual Exploration of Machine Learning Explanations." 2020 IEEE Pacific Visualization Symposium, PacificVis 2020 - Proceedings (pp. 26-35).
Michael Gleicher et al., "Boxer: Interactive Comparison of Classifier Results." Eurographics Conference on Visualization (EuroVis) 2020, vol. 39, No. 3, 13 Pages.
Jean-Bastien Grill et al., "Bootstrap Your Own Latent ANewApproach to Self-Supervised Learning." 34th Conference on Neural Information Processing Systems (NeurIPS 2020), Vancouver, Canada, 14 Pages.
Ursula Hebert-Johnson et al., "Multicalibration: Calibration for the (Computationally-Identifiable) Masses." Proceedings of the 35th International Conference on Machine Learning, Stockholm, Sweden, PMLR 80, 2018, 10 Pages.
Guolin Ke et al., "LightGBM: A Highly Efficient Gradient Boosting Decision Tree." 31st Conference on Neural Information Processing Systems (NIPS 2017), Long Beach, CA, USA, 9 Pages.
Thomas Kehrenberg et al., "Null-sampling for interpretable and fair representations." European Conference on Computer Vision, Springer 2020, 16 Pages.
Michael P. Kim et al., "Multiaccuracy: Black-Box Post-Processing for Fairness in Classification." AIES'19, Jan. 27-28, 2019, Honolulu, HI, USA, pp. 247-254.
Arzam Kotriwala et al., "XAI for Operations in the Process Industry Applications, Theses, and Research Directions." AAAI Spring Symposium: Combining Machine Learning with Knowledge Engineering, 2021, 12 Pages.
Daniel Levy et al., "Large-Scale Methods for Distributionally Robust Optimization." 34th Conference on Neural Information Processing Systems (NeurIPS 2020), Vancouver, Canada, 14 Pages.
Da Li et al., "Learning to Generalize: Meta-Learning for Domain Generalization." The Thirty-Second AAAI Conference on Artificial Intelligence (AAAI—2018), pp. 3490-3497.
Ziwei Liu et al., "Deep Learning Face Attributes in the Wild." Proceedings of International Conference on Computer Vision (ICCV), Dec. 2015, pp. 3730-3738.
Ishan Misra et al., "Self-Supervised Learning of Pretext-Invariant Representations." Proceedings of the IEEE/CVF Conference on Computer Vision and Pattern Recognition 2020, pp. 6707-6717.
Mohammad Motamedi et al., "AData-Centric Approach for Training Deep Neural Networks with Less Data." arXiv:2110.03613v2 [cs.AI] Oct. 29, 2021, 5 Pages.
Cecilia Panigutti et al., "Doctor XAI An ontology-based approach to black-box sequential data classification explanations." Proceedings of the 2020 conference on fairness, accountability, and transparency 2020, pp. 629-639.
Eliana Pastor et al., "Identifying Biased Subgroups in Ranking and Classification." arXiv:2108.07450v1 [cs.LG] Aug. 17, 2021, 5 Pages.
Eliana Pastor et al., "HowDivergent Is Your Data?" Proceedings of the VLDB Endowment 2021, vol. 14, No. 12, pp. 2835-2838.
Alexander Ratner et al., "Data Programming: Creating Large Training Sets, Quickly." 30th Conference on Neural Information Processing Systems (NIPS 2016), Barcelona, Spain, 9 Pages.
Svetlana Sagadeeva et al., "SliceLine: Fast, Linear-Algebra-based Slice Finding for ML ModelDebugging." Proceedings of the 2021 International Conference on Management of Data, 10 Pages.
Patrick Schober et al., "Correlation Coefficients: Appropriate Use and Interpretation." Anesthesia & Analgesia May 2018, vol. 126, No. 5, pp. 1763-1768.
Megha Srivastava et al., "Robustness to Spurious Correlations via Human Annotations." Proceedings of the 37th International Conference on Machine Learning, Online, PMLR 119, 2020, 11 Pages.
Jure Zbontar et al., "Barlow Twins: Self-Supervised Learning via Redundancy Reduction." Proceedings of the 38th International Conference on Machine Learning, PMLR 139, 2021, 11 Pages.

(56) References Cited

OTHER PUBLICATIONS

Chunting Zhou et al., "Examining and Combating Spurious Features under Distribution Shift." Proceedings of the 38th International Conference on Machine Learning , PMLR139, 2021, 11 Pages.
Kaiyang Zhou et al., "Domain Generalization: A Survey." arXiv:2103.02503v7 [cs.LG] Aug. 12, 2022, 20 Pages.
Marco Tulio Ribeiro et al., ""Why Should I Trust You?" Explaining the Predictions of Any Classifier." Proceedings of the 22nd ACM SIGKDD international conference on knowledge discovery and data mining. 2016, pp. 1135-1144.
Guy Barash et al., "Bridging the gap between ML solutions and their business requirements using feature interactions." Proceedings of the 2019 27th ACM Joint Meeting on European Software Engineering Conference and Symposium on the Foundations of Software Engineering, pp. 1048-1058, 2019.
Ninareh Mehrabi et al., "A Survey on Bias and Fairness in Machine Learning." ACM Computing Surveys, vol. 54, Issue 6, Jul. 2021 Article No. 115, pp. 1-35.
Subhajit Das et al., "BEAMES: Interactive Multimodel Steering, Selection, and Inspection for Regression Tasks." IEEE Computer Graphics Applications 2019, vol. 39, No. 5, pp. 20-32.
Yeounoh Chung et al., "Automated Data Slicing for Model Validation: A Big Data—AI Integration Approach." IEEE Transactions on Knowledge and Data Engineering, 2020, vol. 32, No. 12, pp. 2284-2296.
Ángel Alexander Cabrera et al., "FAIRVIS: Visual Analytics for Discovering Intersectional Bias in Machine Learning." 2019 IEEE Conference on Visual Analytics Science and Technology (VAST), 2019, pp. 46-56.
Smiti Kaul et al., "Improving Visualization Interpretation Using Counterfactuals," IEEE Transactions on Visualization and Computer Graphics, vol. 28, Issue: 1, Jan. 2022, pp. 998-1008.
Jiawei Zhang et al., "Manifold: A Model-Agnostic Framework for Interpretation and Diagnosis of Machine Learning Models," IEEE Transactions on Visualization and Computer Graphics, Jan. 2019, vol. 25, No. 1, pp. 364-373.
Jorge Piazentin Ono e al., "PipelineProfiler: A Visual Analytics Tool for the Exploration of AutoML Pipelines." IEEE Transactions on Visualization and Computer Graphics, , Feb. 2021, vol. 27, No. 2, pp. 390-400.
Yeounoh Chung et al., "Slice Finder: Automated Data Slicing for Model Validation." 2019 IEEE 35th International Conference on Data Engineering (ICDE), 2019, pp. 1550-1553.
Angelos Chatzimparmpas et al., "StackGenVis: Alignment of Data, Algorithms, and Models for Stacking Ensemble Learning Using Performance Metrics." IEEE Transactions on Visualization and Computer Graphics, Feb. 2021, vol. 27, No. 2, pp. 1547-1557.
Ji Soo Yi et al., "Toward a Deeper Understanding of the Role of Interaction in Information Visualization." IEEE Transactions on Visualization and Computer Graphics, Nov./ Dec. 2007, vol. 13, No. 6, pp. 1224-1231.
Wenbin He et al., "Where Can We Help? A Visual Analytics Approach to Diagnosing and Improving Semantic Segmentation of Movable Objects." IEEE Transactions on Visualization and Computer Graphics, vol. 28, No. 1, Jan. 2022, pp. 1040-1050.
Ke Xu et al., "EnsembleLens: Ensemble-based Visual Exploration of Anomaly Detection Algorithms with Multidimensional Data." IEEE Transactions on Visualization and Computer Graphics, Jan. 2019, vol. 25, No. 1, pp. 109-119.

* cited by examiner

| Itemsets | tn | fp | fn | tp | Accuracy |
|---|---|---|---|---|---|
| (Blinking_Light=1.0, ReflectionsOrShadows=0.0) | 8392 | 5682 | 0 | 0 | 0.596277 |
| (Type=Negative, OutdoorType=Indoor, DirectedMotion=0.0, ReflectionsOrShadows=0.0) | 13354 | 5990 | 0 | 0 | 0.690343 |
| (SmokeDensity=0.0, OutdoorType=Indoor, DirectedMotion=0.0, ReflectionsOrShadows=0.0) | 13354 | 5990 | 0 | 0 | 0.690343 |
| (SmokeDensity=0.0, ReflectionsOrShadows=0.0) | 20570 | 6702 | 0 | 0 | 0.754253 |

SYSTEM AND METHOD FOR EFFICIENT ANALYZING AND COMPARING SLICE-BASED MACHINE LEARN MODELS

TECHNICAL FIELD

The present disclosure relates to image processing utilizing a machine learning model, including interfaces that may be utilized with them.

BACKGROUND

Machine Learning (ML) has been used in a variety of critical applications, including autonomous driving, medical imaging, industrial fire detection, and credit scoring. Such applications need to be thoroughly evaluated before deployment in order to assess model capabilities and limitations. Unforeseen model mistakes may cause serious consequences in the real world: for example, a false sense of security in ML models may cause safety issues in driver assistance and industrial systems, misdiagnoses in medical analysis or treatment analysis, and biases against individuals and groups.

MLOps (Machine Learning Operations) engineers for product-quality model development may need a system that has identified that the evaluation of critical ML models and may be usually conducted beyond the aggregated level (e.g., a single performance metric). Instead, it may be beneficial to thoroughly evaluate model performance on carefully specified usage scenarios or conditions to meet important ML product requirements. Based on this analysis, experts can then take actions to both attempt to make the model more robust to various conditions and make customers aware of model limitations in certain conditions, aiding in the development of mitigating measures. During the evaluation of ML models, model developers often have to slice (e.g., group a subset of data with common attributes, performance, etc.) their data based on the specified product usage conditions, to ensure satisfactory performance under such critical conditions. For example, in the autonomous driving setting, experts may need to ensure high detection rates for multiple environmental conditions, such as sunny weather and rain, and specific object types, such as cars and pedestrians.

While the slice-based analysis may be essential for the critical applications, this approach may have several limitations. First, manually slicing the data is a very time-consuming task. Such a task may involve manually creating rules to slice the data, running evaluation scripts on the data subsets, and comparing the results on various data subsets. Second, ML experts cannot explore all possible data subsets to identify relevant failures cases for their application. Data slices can be created by any number of interpretable metadata (e.g., weather and temperature for autonomous driving), resulting in an exponentially large search space. Therefore, the experts may have to rely on domain-specific priors to select what metadata they will slice the data based on. Third, once the critical failures are identified, experts have the options to either collect more data to cover the weakness scenarios or retrain their models by prioritizing the critical slices. While the former requires additional investment on data collection, the latter is usually time consuming, particularly for training neural network architectures. Moreover, it is unclear how the new model will trade-off performance on other slices and whether the result can still meet the product requirements.

SUMMARY

A first embodiment, a computer-implemented method for a machine-learning network includes receiving an input dataset, wherein the input dataset is indicative of image information, tabular information, radar information, sonar information, or sound information, sending the input dataset to the machine-learning model to output predictions associated with the input data, identifying one or more slices associated with the input dataset and the machine learning model in a first iteration, wherein each of the one or more slices include input data from the input dataset and common attributes associated with each slice, outputting an interface that includes information associated with the one or more slices and performance measurements of the one or more slices of the first iteration and subsequent iterations identifying subsequent slices, wherein the performance measurements relate to the predictions associated with the first iteration and subsequent iterations.

A second embodiment, a system includes an input interface configured to receive an input dataset, wherein the input dataset is indicative of image information, tabular information, radar information, sonar information, or sound information. The system includes a processor in communication with the input interface. The processor is programmed to receive an input dataset from the input interface, send the input dataset to the machine-learning model to output predictions associated with the input data, identify one or more slices associated with the input dataset and the machine learning model in a first iteration, wherein each of the one or more slices include input data from the input dataset and common attributes associated with each slice, and output a visual user interface that includes information associated with the one or more slices and performance measurements of the one or more slices of the first iteration and subsequent iterations identifying subsequent slices of a subsequent machine learning model, wherein the performance measurements relate to the predictions associated with the first iteration and subsequent iterations.

A third embodiment, a system includes an input interface configured to receive an input dataset. The system includes a processor in communication with the input interface, wherein the processor is programmed to receive the input dataset from the input interface, send the input dataset to the machine-learning model to output predictions associated with the input data, identify one or more slices associated with the input dataset and the machine learning model in a first iteration, wherein each of the one or more slices include input data from the input dataset and common attributes associated with each slice, identify one or more subsequent slices associated with the input dataset and a subsequent machine learning model in a subsequent iteration, and output a visual user interface that includes information associated with the one or more slices and performance measurements of the first iteration and the subsequent iteration identifying subsequent slices, wherein the performance measurements relate to the predictions associated with the first iteration and subsequent iterations.

DETAILED DESCRIPTION

Figure 1:
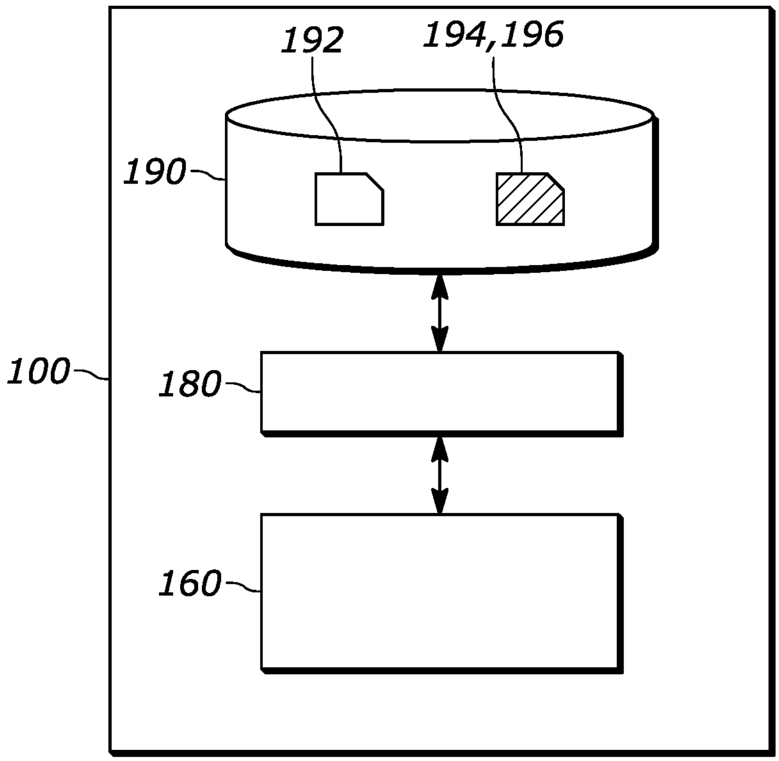
FIG. 1 shows a system 100 for training a neural network.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Real-world machine learning applications may need to be thoroughly evaluated to meet critical product requirements for model release, to ensure fairness for different groups or individuals, and to achieve a consistent performance in various scenarios. For example, in autonomous driving, an object classification model should achieve high detection rates under different conditions of weather, distance, etc. Similarly, in the financial setting, credit-scoring models must not discriminate against certain individuals or groups. These conditions or groups may sometimes be referred to as "Data Slices". In product MLOps cycles, product developers must identify such critical data slices and adapt models to mitigate data slice problems. Discovering where models fail, understanding why they fail, and mitigating these problems, are therefore essential tasks in the MLOps life-cycle.

The disclosure below may include details regarding a visual analytics (VA) framework, which may be referred to as "SliceTeller", as a tool that allows users to debug, compare and improve machine learning models driven by critical data slices. This VA framework may automatically discover problematic slices in the data, and help the user understand why particular models fail. More importantly, the disclosure may include an efficient model/network/algorithm, sometime referred to as "SliceBoosting", to estimate trade-offs when prioritizing the optimization over certain slices. Furthermore, our system empowers model developers to compare and analyze different model versions during model iterations, allowing them to choose the model version best suitable for their applications.

As discussed in more detail below, the system may utilize a VA framework that may be sometimes referred as "SliceTeller". This may be a novel data slice-driven model validation tool that automates slice finding, enables slice-based model validation and comparison, and allows a what-if analysis for slice prioritization. The tool takes as input the data (non-interpretable features), metadata (interpretable properties that can be used to slice the data), dataset labels and model predictions. A "slicefinding" algorithm may be adapted to find slices on the data for which a performance metric (for example, accuracy) may be different from the overall model metric. Once these slices are found, the system may use a binary matrix graphical encoding to show the data slices compactly, as well as metrics for these data slices (as shown in detail at FIG. 6). The graphical user interface may be displayed on any type of display, such as a monitor, tablet, cellular phone, laptop monitor, television, etc. The system and method may also provide various visualization to help users understand and interpret such data slices via a graphical user interface or similar interface. After a data slice of interest is found, users can estimate the performance impact of optimizing the model for this data slice using an effect estimation algorithm, which may be referred to as SliceBoosting. Thus, in an efficient manner, a user may be able to see the impact to performance of other slices after adjusting a certain slice. Thus, users may be able to quickly find problematic data slices on their model and derive actionable insights that can be used to improve the results according to their product requirements in a next training iteration.

Thus, the disclosure may be an effective VA tool for machine learning (ML) model validation with a data-slice driven approach. This tool may be model-agnostic and can be easily plugged in a MLOps life-cycles. As compared to training multiple models from scratch for comparison, there are three disadvantages with the prior systems. First, since the model training process is time-consuming, the experimentation cycle is easily interrupted, and the model iteration is slow. Second, it may require significant efforts from the users/experts to keeping track of multiple models trained across different data slices. Third, to draw experimentation conclusions and identify the slice trade-offs, the system may need to switch between development tools multiple times. Similar approaches have used weak learners to reduce model biases and improve performance, such as (as non-limiting examples) Multicalibrated Predictor and MultiAccuracy Boosting. However, while these approaches train and evaluate multiple boosted models to improve model accuracy, the disclosure described herein, may use a simplified approach with a single boosted model to estimate the effect of subgroup optimization and allow for quick experimentation.

FIG. 1 shows a system 100 for training a neural network. The system 100 may comprise an input interface for accessing training data 192 for the neural network. For example, as illustrated in FIG. 1, the input interface may be constituted by a data storage interface 180 which may access the training data 192 from a data storage 190. For example, the data storage interface 180 may be a memory interface or a persistent storage interface, e.g., a hard disk or an SSD interface, but also a personal, local or wide area network interface such as a Bluetooth, Zigbee or Wi-Fi interface or an ethernet or fiberoptic interface. The data storage 190 may be an internal data storage of the system 100, such as a hard drive or SSD, but also an external data storage, e.g., a network-accessible data storage.

In some embodiments, the data storage 190 may further comprise a data representation 194 of an untrained version of the neural network which may be accessed by the system 100 from the data storage 190. It will be appreciated, however, that the training data 192 and the data representation 194 of the untrained neural network may also each be accessed from a different data storage, e.g., via a different subsystem of the data storage interface 180. Each subsystem may be of a type as is described above for the data storage interface 180. In other embodiments, the data representation 194 of the untrained neural network may be internally generated by the system 100 on the basis of design parameters for the neural network, and therefore may not explicitly be stored on the data storage 190. The system 100 may further comprise a processor subsystem 160 which may be configured to, during operation of the system 100, provide an iterative function as a substitute for a stack of layers of the neural network to be trained. Here, respective layers of the stack of layers being substituted may have mutually shared weights and may receive, as input, an output of a previous layer, or for a first layer of the stack of layers, an initial activation, and a part of the input of the stack of layers. The processor subsystem 160 may be further configured to iteratively train the neural network using the training data 192. Here, an iteration of the training by the processor subsystem 160 may comprise a forward propagation part and a backward propagation part. The processor subsystem 160 may be configured to perform the forward propagation part by, amongst other operations defining the forward propagation part which may be performed, determining an equilibrium point of the iterative function at which the iterative function converges to a fixed point, wherein determining the equilibrium point comprises using a numerical root-finding algorithm to find a root solution for the iterative function minus its input, and by providing the equilibrium point as a substitute for an output of the stack of layers in the neural network. The system 100 may further comprise an output interface for outputting a data representation 196 of the trained neural network, this data may also be referred to as trained model data 196. For example, as also illustrated in FIG. 1, the output interface may be constituted by the data storage interface 180, with said interface being in these embodiments an input/output ("IO") interface, via which the trained model data 196 may be stored in the data storage 190. For example, the data representation 194 defining the 'untrained' neural network may during or after the training be replaced, at least in part by the data representation 196 of the trained neural network, in that the parameters of the neural network, such as weights, hyperparameters and other types of parameters of neural networks, may be adapted to reflect the training on the training data 192. This is also illustrated in FIG. 1 by the reference numerals 194, 196 referring to the same data record on the data storage 190. In other embodiments, the data representation 196 may be stored separately from the data representation 194 defining the 'untrained' neural network. In some embodiments, the output interface may be separate from the data storage interface 180, but may in general be of a type as described above for the data storage interface 180.

Figure 2:
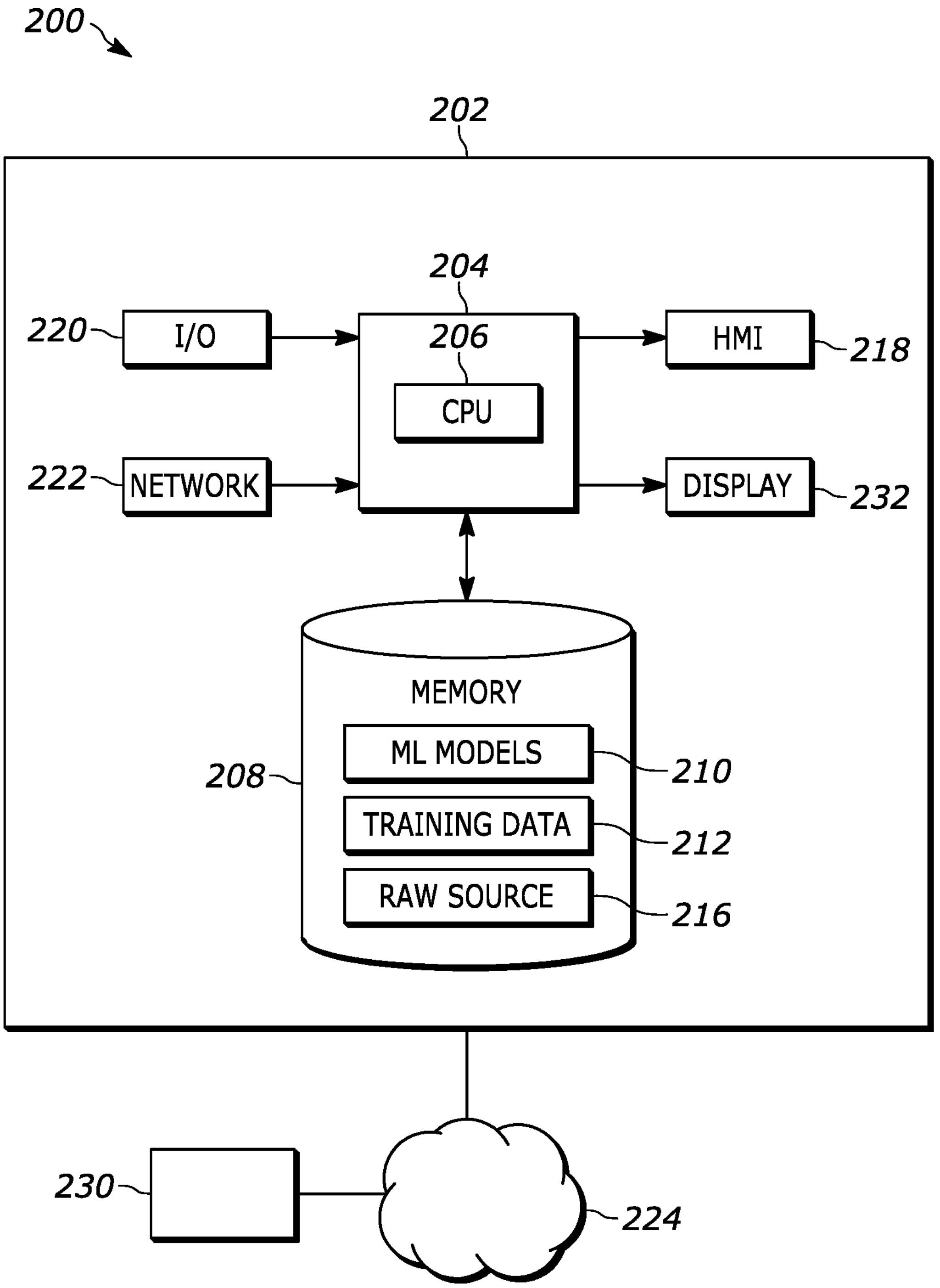
FIG. 2 shows a computer-implemented method 200 for training a neural network.

FIG. 2 depicts a data annotation system 200 to implement a system for annotating data.

The data annotation system 200 may include at least one computing system 202. The computing system 202 may include at least one processor 204 that is operatively connected to a memory unit 208.

The processor 204 may include one or more integrated circuits that implement the functionality of a central processing unit (CPU) 206. The CPU 206 may be a commercially available processing unit that implements an instruction stet such as one of the x86, ARM, Power, or MIPS instruction set families. During operation, the CPU 206 may execute stored program instructions that are retrieved from the memory unit 208. The stored program instructions may include software that controls operation of the CPU 206 to perform the operation described herein. In some examples, the processor 204 may be a system on a chip (SoC) that integrates functionality of the CPU 206, the memory unit 208, a network interface, and input/output interfaces into a single integrated device. The computing system 202 may implement an operating system for managing various aspects of the operation.

The memory unit 208 may include volatile memory and non-volatile memory for storing instructions and data. The non-volatile memory may include solid-state memories, such as NAND flash memory, magnetic and optical storage media, or any other suitable data storage device that retains data when the computing system 202 is deactivated or loses electrical power. The volatile memory may include static and dynamic random-access memory (RAM) that stores program instructions and data. For example, the memory unit 208 may store a machine-learning model 210 or algorithm, a training dataset 212 for the machine-learning model 210, raw source dataset 216.

The computing system 202 may include a network interface device 222 that is configured to provide communication with external systems and devices. For example, the network interface device 222 may include a wired and/or wireless Ethernet interface as defined by Institute of Electrical and Electronics Engineers (IEEE) 802.11 family of standards. The network interface device 222 may include a cellular communication interface for communicating with a cellular network (e.g., 3G, 4G, 5G). The network interface device 222 may be further configured to provide a communication interface to an external network 224 or cloud.

The external network 224 may be referred to as the world-wide web or the Internet. The external network 224 may establish a standard communication protocol between computing devices. The external network 224 may allow information and data to be easily exchanged between computing devices and networks. One or more servers 230 may be in communication with the external network 224.

The computing system 202 may include an input/output (I/O) interface 220 that may be configured to provide digital and/or analog inputs and outputs. The I/O interface 220 may include additional serial interfaces for communicating with external devices (e.g., Universal Serial Bus (USB) interface).

The computing system 202 may include a human-machine interface (HMI) device 218 that may include any device that enables the system 200 to receive control input. Examples of input devices may include human interface inputs such as keyboards, mice, touchscreens, voice input devices, and other similar devices. The computing system 202 may include a display device 232. The computing system 202 may include hardware and software for outputting graphics and text information to the display device 232. The display device 232 may include an electronic display screen, projector, printer or other suitable device for displaying information to a user or operator. The computing system 202 may be further configured to allow interaction with remote HMI and remote display devices via the network interface device 222.

The system 200 may be implemented using one or multiple computing systems. While the example depicts a single computing system 202 that implements all of the described features, it is intended that various features and functions may be separated and implemented by multiple computing units in communication with one another. The particular system architecture selected may depend on a variety of factors.

The system 200 may implement a machine-learning algorithm 210 that is configured to analyze the raw source dataset 216. The raw source dataset 216 may include raw or unprocessed sensor data that may be representative of an input dataset for a machine-learning system. The raw source dataset 216 may include video, video segments, images, text-based information, and raw or partially processed sensor data (e.g., radar map of objects). In some examples, the machine-learning algorithm 210 may be a neural network algorithm that is designed to perform a predetermined function. For example, the neural network algorithm may be configured in automotive applications to identify pedestrians in video images.

The computer system 200 may store a training dataset 212 for the machine-learning algorithm 210. The training dataset 212 may represent a set of previously constructed data for training the machine-learning algorithm 210. The training dataset 212 may be used by the machine-learning algorithm 210 to learn weighting factors associated with a neural network algorithm. The training dataset 212 may include a set of source data that has corresponding outcomes or results that the machine-learning algorithm 210 tries to duplicate via the learning process. In this example, the training dataset 212 may include source videos with and without pedestrians and corresponding presence and location information. The source videos may include various scenarios in which pedestrians are identified.

The machine-learning algorithm 210 may be operated in a learning mode using the training dataset 212 as input. The machine-learning algorithm 210 may be executed over a number of iterations using the data from the training dataset 212. With each iteration, the machine-learning algorithm 210 may update internal weighting factors based on the achieved results. For example, the machine-learning algorithm 210 can compare output results (e.g., annotations) with those included in the training dataset 212. Since the training dataset 212 includes the expected results, the machine-learning algorithm 210 can determine when performance is acceptable. After the machine-learning algorithm 210 achieves a predetermined performance level (e.g., 100% agreement with the outcomes associated with the training dataset 212), the machine-learning algorithm 210 may be executed using data that is not in the training dataset 212. The trained machine-learning algorithm 210 may be applied to new datasets to generate annotated data.

The machine-learning algorithm 210 may be configured to identify a particular feature in the raw source data 216. The raw source data 216 may include a plurality of instances or input dataset for which annotation results are desired. For example, the machine-learning algorithm 210 may be configured to identify the presence of a pedestrian in video images and annotate the occurrences. The machine-learning algorithm 210 may be programmed to process the raw source data 216 to identify the presence of the particular features. The machine-learning algorithm 210 may be configured to identify a feature in the raw source data 216 as a predetermined feature (e.g., pedestrian). The raw source data 216 may be derived from a variety of sources. For example, the raw source data 216 may be actual input data collected by a machine-learning system. The raw source data 216 may be machine generated for testing the system. As an example, the raw source data 216 may include raw video images from a camera.

In the example, the machine-learning algorithm 210 may process raw source data 216 and output an indication of a representation of an image. The output may also include augmented representation of the image. A machine-learning algorithm 210 may generate a confidence level or factor for each output generated. For example, a confidence value that exceeds a predetermined high-confidence threshold may indicate that the machine-learning algorithm 210 is confident that the identified feature corresponds to the particular feature. A confidence value that is less than a low-confidence threshold may indicate that the machine-learning algorithm 210 has some uncertainty that the particular feature is present.

Figure 3:
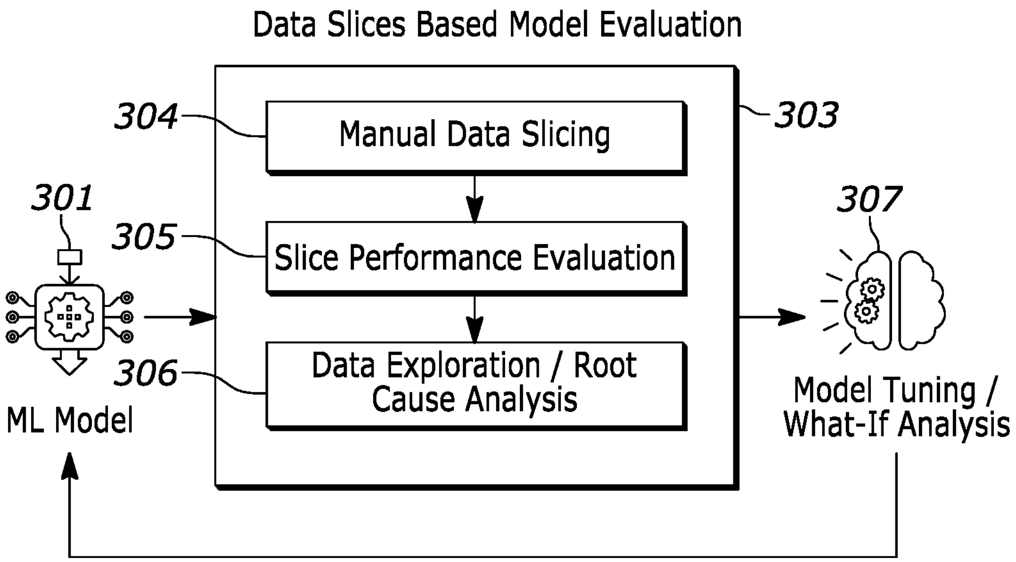
FIG. 3 illustrates an embodiment of a system workflow identifying data slices and attributes associated with the data slices.

FIG. 3 discloses a data slice based model evaluation. The system may include a machine learning model, such as those described above. Furthermore, FIG. 3 discloses a common workflow for model analysis 303 and iteration. The experts may manually slice their data at step based on product and domain requirements, computed model performances per slice 305, and explored the data to identify the root causes for potential model mistakes 306. Based on such observations, the system and method may iterate over the model, by restraining while re-prioritizing certain data slices over others.

FIG. 3 is one example of a model evaluation workflow of a machine learning model 301 that is derived from experts that may require manual slicing at step 304. In various cases, experts may desire to slice the data into various scenarios, thoroughly evaluate their models 301, understand the failure cases 306, and develop strategies to tune the models 307 to improve performance. Users may spend a significant amount of time slicing the data based on certain heuristics to learn the boundaries of the model. The system should automatically identify these data slices in the validation dataset and present an overview to the user.

Data slicing and needs may be different for the various environments and applications that the data and ML model is utilized. In the context of autonomous driving, experts may be interested in modeling the ultrasonic sensors to understand the car surroundings. Such modeling may be a critical modality in the sensor-fusion pipeline to enhance the overall system robustness. The raw ultrasonic sensor data may not be directly interpretable by a human. However, every sample may also contain metadata describing the experiment setup, for example, the object type, distance, sensor location, time of day, etc. It may be beneficial to utilize a trained a tree boosting model to classify nearby objects' heights (as "high" or "low") using the sensor-derived tabular features. While evaluating their models, it may be beneficial to make sure that certain critical objects have a low error rate. In some cases, it may require a trade-off between the performance of non-critical objects for the performance of the critical objects. For instance, children, curbstones, and nearby cars may have the highest priority. Therefore, in every evaluation iteration, it may be important to slice the data, evaluate the model on the data subsets, and retrain the model with different parameters to mitigate critical mistakes. Such tasks were tedious and time-consuming.

In another example, such as a use case for fire detection applications, it may be beneficial to train a deep neural network to detect smoke and fire on video frames. In this setup, the video segment may be associated with interpretable metadata that described the video collection process in detail, for example, the recording location, time of day, the smoke density, and whether there were blinking lights in the scene. While the overall performance of this model was high, experts were interested in identifying situations where it failed. Therefore, they spent a large amount of time inspecting the model and using the video metadata to identify these situations. Transparency with customers may be a high priority for model release. The customers may want to clearly communicate the model capabilities, where it was effective and where it failed. Furthermore, they wanted to understand why the model was failing, and what were the possible confounding features on their dataset.

Figure 4:
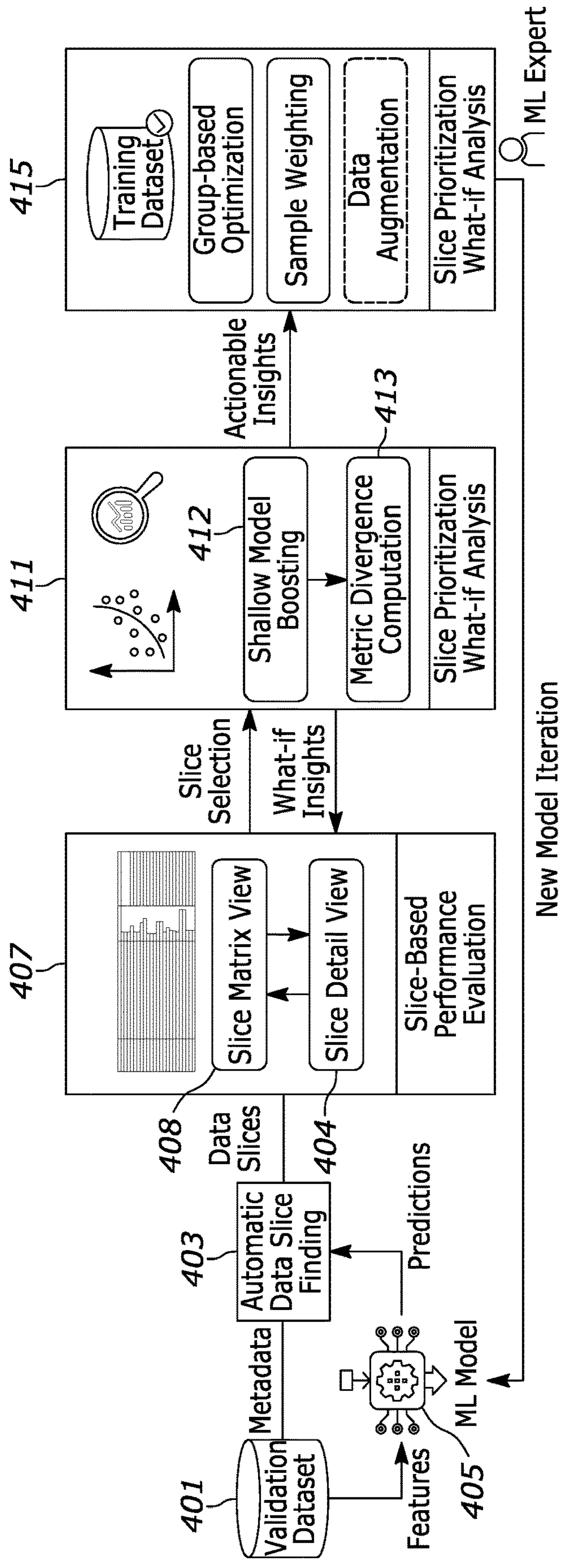
FIG. 4 illustrates an embodiment of a workflow model of an overall system.

FIG. 4 illustrates an illustrative embodiment of a workflow model of an overall system. The system may include a visual interface. The system may sometimes be referred to as SliceTeller. The validation dataset 401 may be an input to the overall system. The validation data may include raw images or tabular features extracted from sensor signals. Furthermore, metadata (e.g., interpretable features that may be utilized to slice the data), and ground truth labels (e.g., object classes or obstacle height).

The system uses an automatic slice finding algorithm 403 to identify data slices where the performance measures (e.g., accuracy) are the most different from the overall model performance. In one example, the automatic slice finding algorithm 403 may be a DivExplorer algorithm, which may be a Frequent Pattern Mining-based approach for such a task. The metadata from the validation data set 401 may be utilized by the automatic data slice finding algorithm 403. Furthermore, the machine learning model 405 may identify predictions based on the features form the dataset 401. The machine learning model may send the predictions to the automatic data slicer 403. Data slicing may be discussed in more detail with respect to FIG. 5. The automatic data slicer may output the data slices to a slice-based performance evaluation 407.

The slice-based performance evaluation interface 407 may include an interface or tool that is output on a display (e.g., computer, tablet, phone, or remote display). The evaluation interface 407 may include a slice matrix view 408. Thus, the system may allow users to quickly visualize and summarize the produced data slices using the Slice Matrix View 408. The slice matrix view may display where rows correspond to slices, and columns, to slice descriptions and associated metrics. The user may be able to select slices to view its details using a slice detail view 404 or a slice distribution view. The slice detail view may output, on an interface, present metadata distributions and correlations to the user. Both the matrix view and the detail view may output and allow the user to identify critical slices in the data, such as slices where the model performance has issues. Thus, the user may be able to select and identify various data and statistics associated with a particular slice that corresponds to be a specific attribute (e.g., in a case of image recognition, bald men.)

Upon a user selecting a specific slice, the user may utilize a test mitigating tool that is configured to adjust various parameters of the system (e.g., including ML model 405) to show a resulting effect to the adjustment. For example, when a critical slice is found, the user can test mitigating measures using a "Slice Prioritization-What-If Analysis" tool 411. The analysis tool 411 may utilize an algorithm (e.g., "Slice-Boosting") to evaluate the effect of optimizing the model for particular data slices. The algorithm may fit a shallow boosting model on top of the original model to estimate the effect of prioritized optimization. The shallow model may be utilize to approximate the residual (e.g., errors) of the slices. The shallow model 412 may be trained and provide metric divergence computation 413 as an option.

Upon a user finding a group of slices to optimize, they may have the ability to export the selected slices back to their programming environment, make changes on data, hyper-parameter or model, and insert the new model back into the system (e.g., visual interface such as SliceTeller) to compare models.

In order to fulfill the requirements identified in the previous section, a system is developed called SliceTelle, a system that tells a story about the evolution of ML models from the perspective of data slices, allowing their evaluation, exploration and comparison. The input to SliceTeller is the validation dataset consisting of validation data (e.g., raw images or tabular features extracted from the sensor signals), metadata (interpretable features that can be used to slice the data), and ground truth labels (e.g., object classes or obstacle height). Note that the system may use a validation dataset for model analysis instead of training data since it is unseen by the model. In the case of model overfitting, the system may observe all slices in the training data having high accuracies.

The system may output information 415 to a machine-learning expert to help modify the system for improvements on a specific application, such as fire detection or autonomous driving. In one example, in order to mitigate the problems found in the data slices, the expert strategy may attempt to increase the training data size, using data collection and data augmentation. To improve particular data slices, the expert may collect more samples in the same conditions of the slices of interest. They would thoroughly inspect the new samples in order to ensure data quality. Another mitigation strategy mentioned is data augmentation. For example, a MLOps team may test different augmentation strategies, such as including frames with added noise and blur to their training data.

Figure 5:
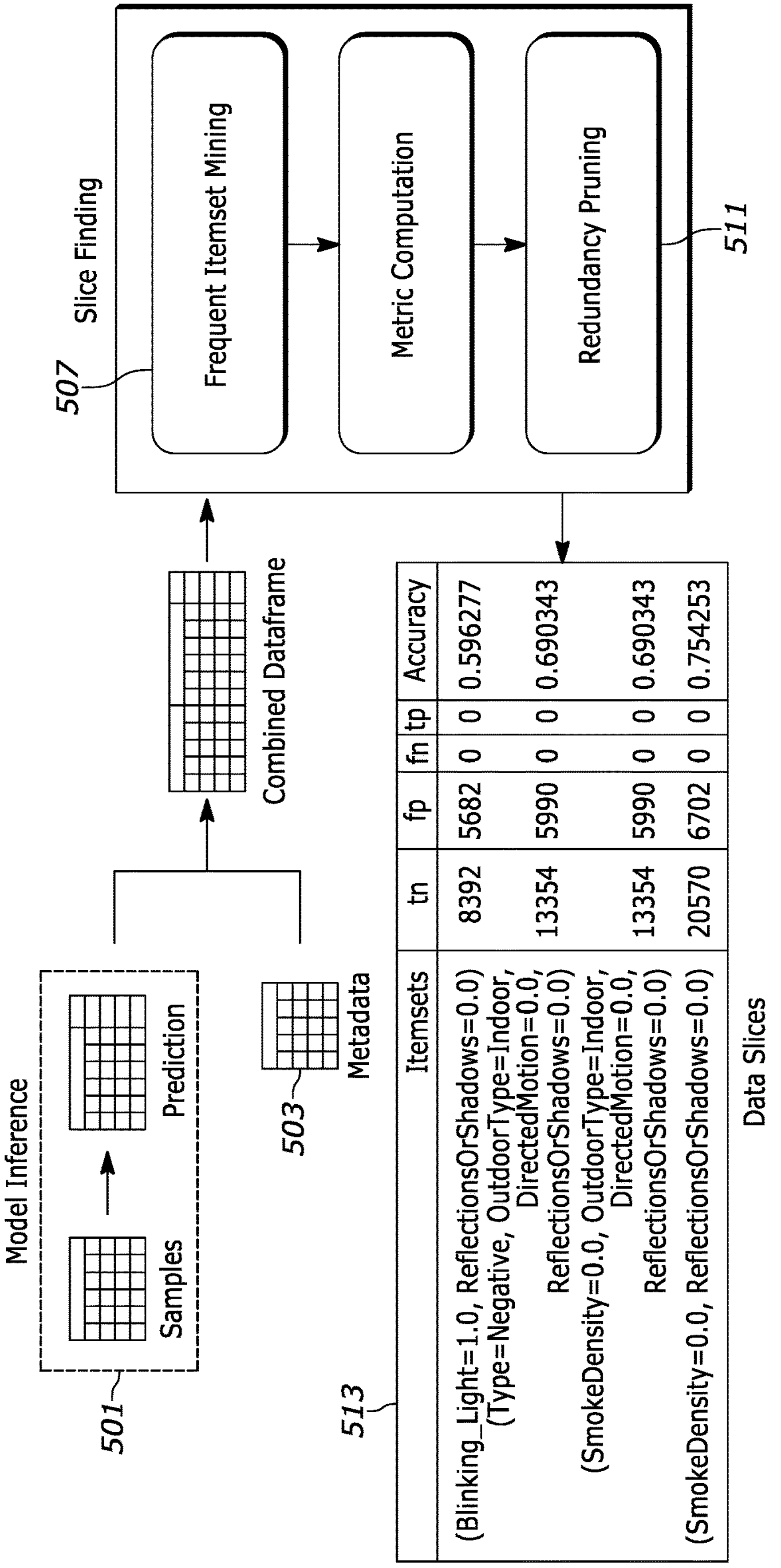
FIG. 5 illustrates an example of a data slicing workflow.

FIG. 5 illustrates a model of data slicing workflow. The system and method may begin an analysis by automatically finding problematic data slices. The system may identify the problematic slices, for example, using the DivExplorer algorithm, as published in the publication title "Looking for trouble: Analyzing classifier behavior via pattern divergence" found in *Proceedings of the* 2021 *International Conference on Management of Data*, pp. 1400-1412, 2021, the entire contents of which are expressly incorporated by reference. As shown in FIG. 5, the system, at a high-level may take its input model predictions 501 combined with interpretable metadata 503 and utilize frequent item set mining 507 to automatically identify the most critical slices. It may then perform slice merging and redundancy removal 511 to generate concise data slices 513. The algorithm may take the model predictions and the meta-data (interpretable features of the dataset) as input, and executes an exhaustive slice search by frequent pattern mining. The minimum support (e.g., minimum slice size) may be defined as a parameter by the user. Then, a model metric such as accuracy is computed for every data slice found.

To reduce the searching time for datasets with a larger number of metadata features, the system may conduct a two-iteration slice finding procedure, such as that utilized in DivExplorer. First, the system may run DivExplorer with a large minimum support to identify the relevant metadata features which are most correlated with poor performance. Then, the system may run DivExplorer again using the relevant metadata features, this time with a lower minimum support to perform a more fine-grained search. The level of granularity (minimum support) can be fine-tuned by the user in order to find the relevant slices for their model. For example, users can fine-tune the parameter to find slices with sufficiently high support and low performance (such attributes are problem-specific and user-defined).

The DivExplorer algorithm may also be utilized to find an exponential number of data slices (exponential in the number of unique feature-value pairs). Therefore, the system may use a summarization approach to reduce the number of slices to be explored by the user. The system may allow users to summarize data slices with a redundancy pruning approach 511. The redundancy pruning approach may be represented by a slider in an interface or application. If the $\alpha$ (e.g., Weather=Sunny) in a slice S will cause an absolute performance change below a redundancy threshold &, only the slice without introduction of an item α (denoted S\ {α}) will be presented to the user. This guarantees that the more general slices can be investigated first. More specifically, let p be the function that computes the performance score on a data slice. A data slice S may be pruned if:

$$\left|p(S) - p\left(\frac{S}{\{a\}}\right)\right| < \epsilon.$$

Figure 6:
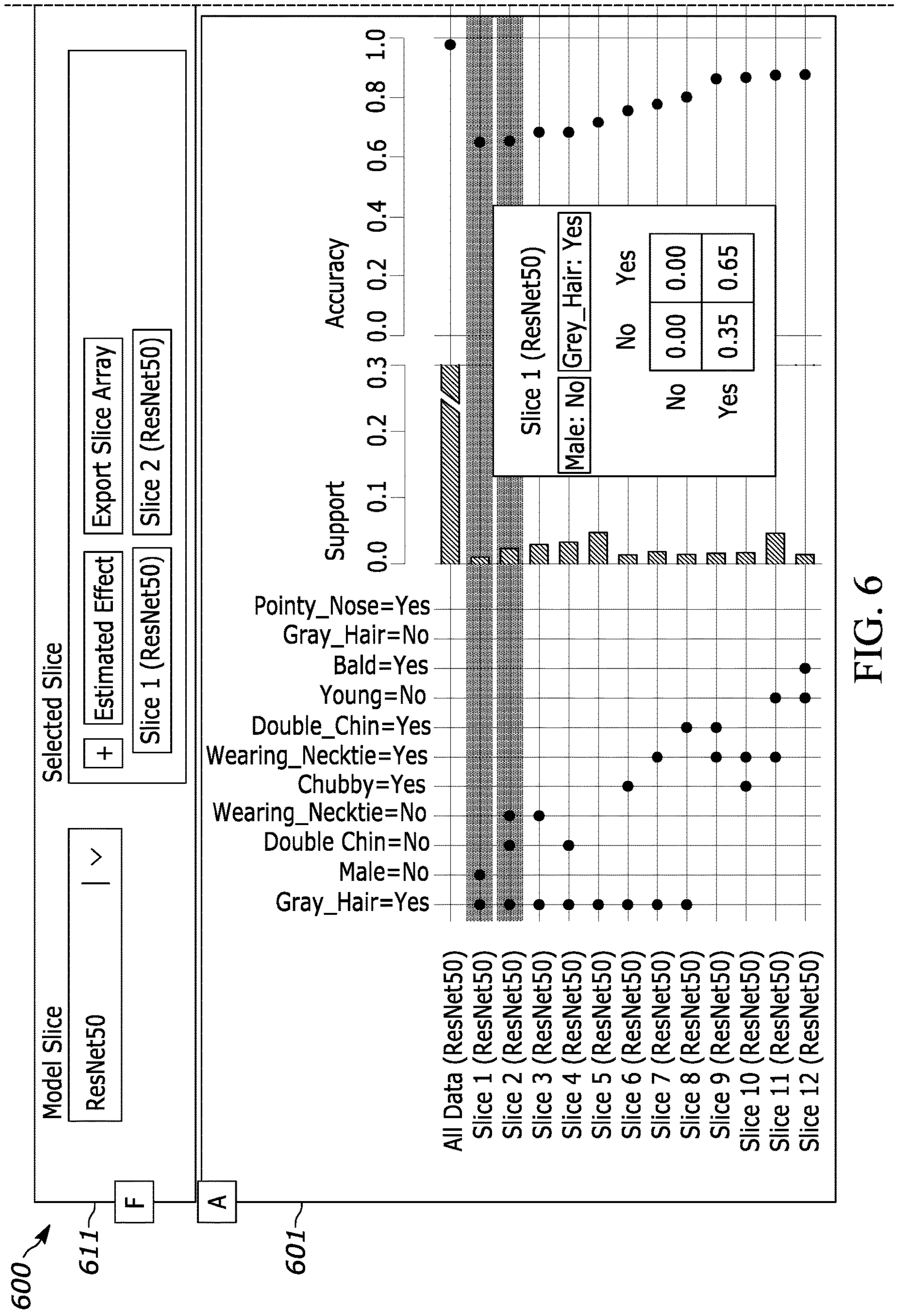
FIG. 6 illustrates an embodiment of an interface with an ability to output attributes associated with various slices of an input data.
Figure 6:
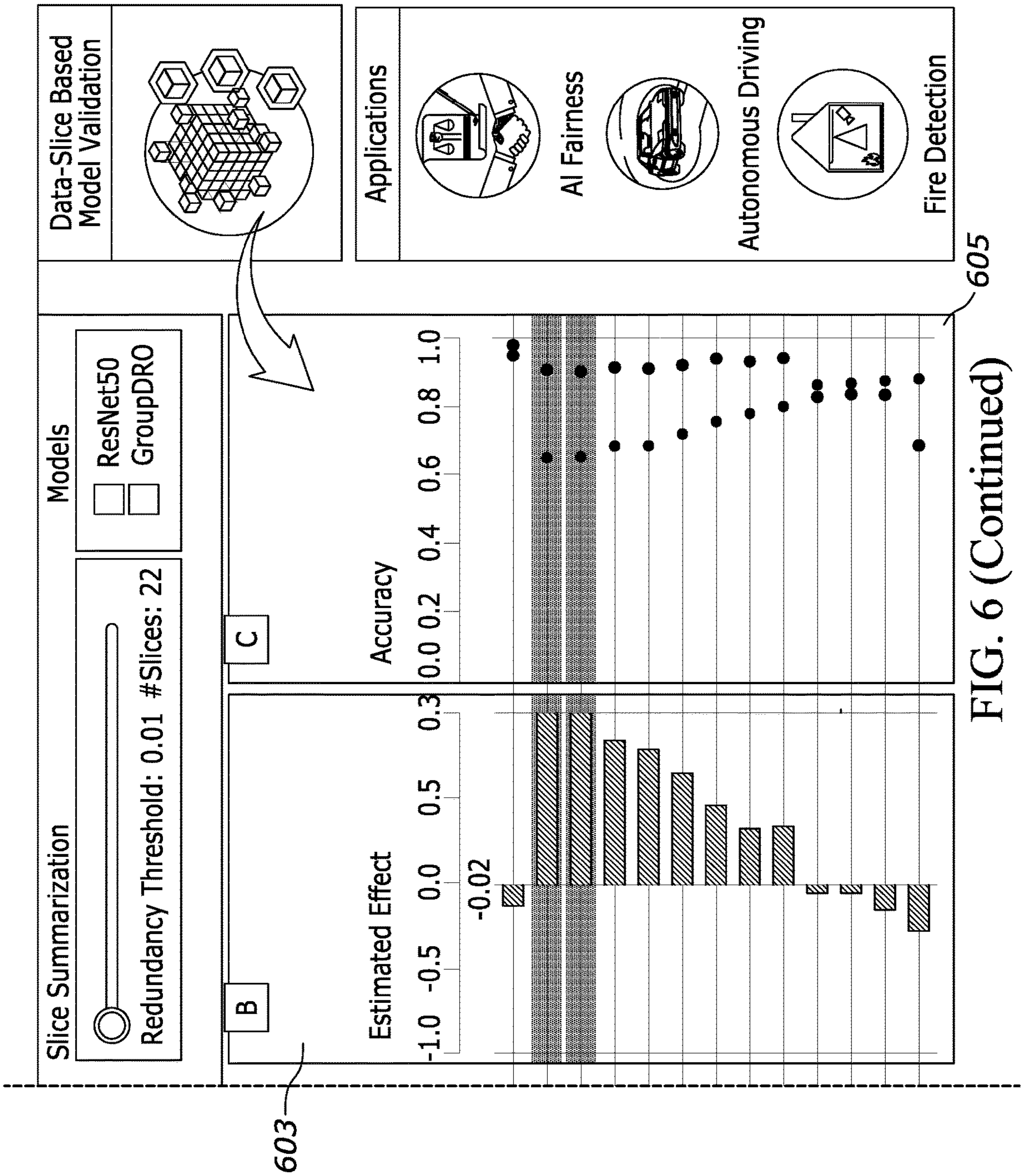
Figure 6:
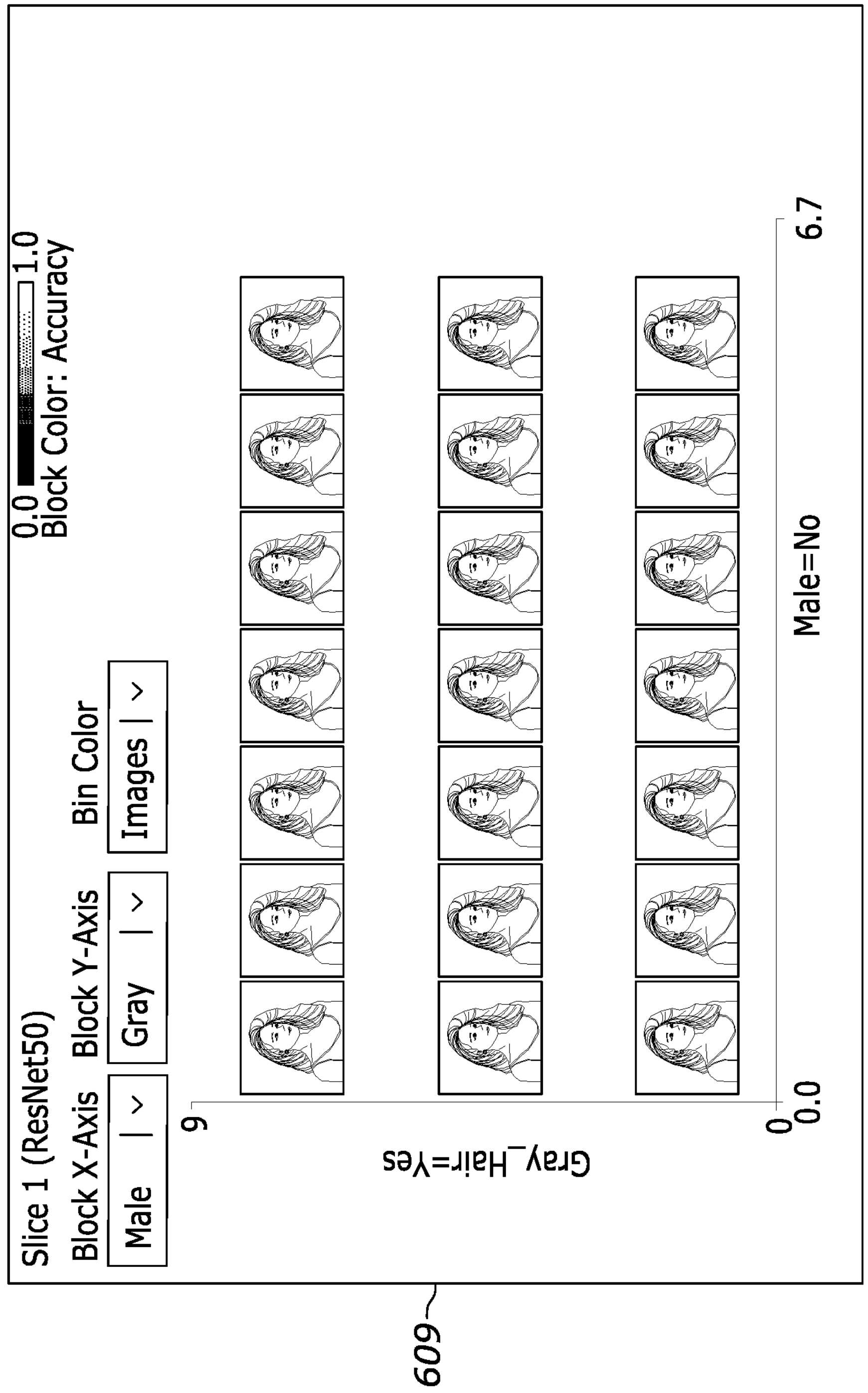
Figure 6:
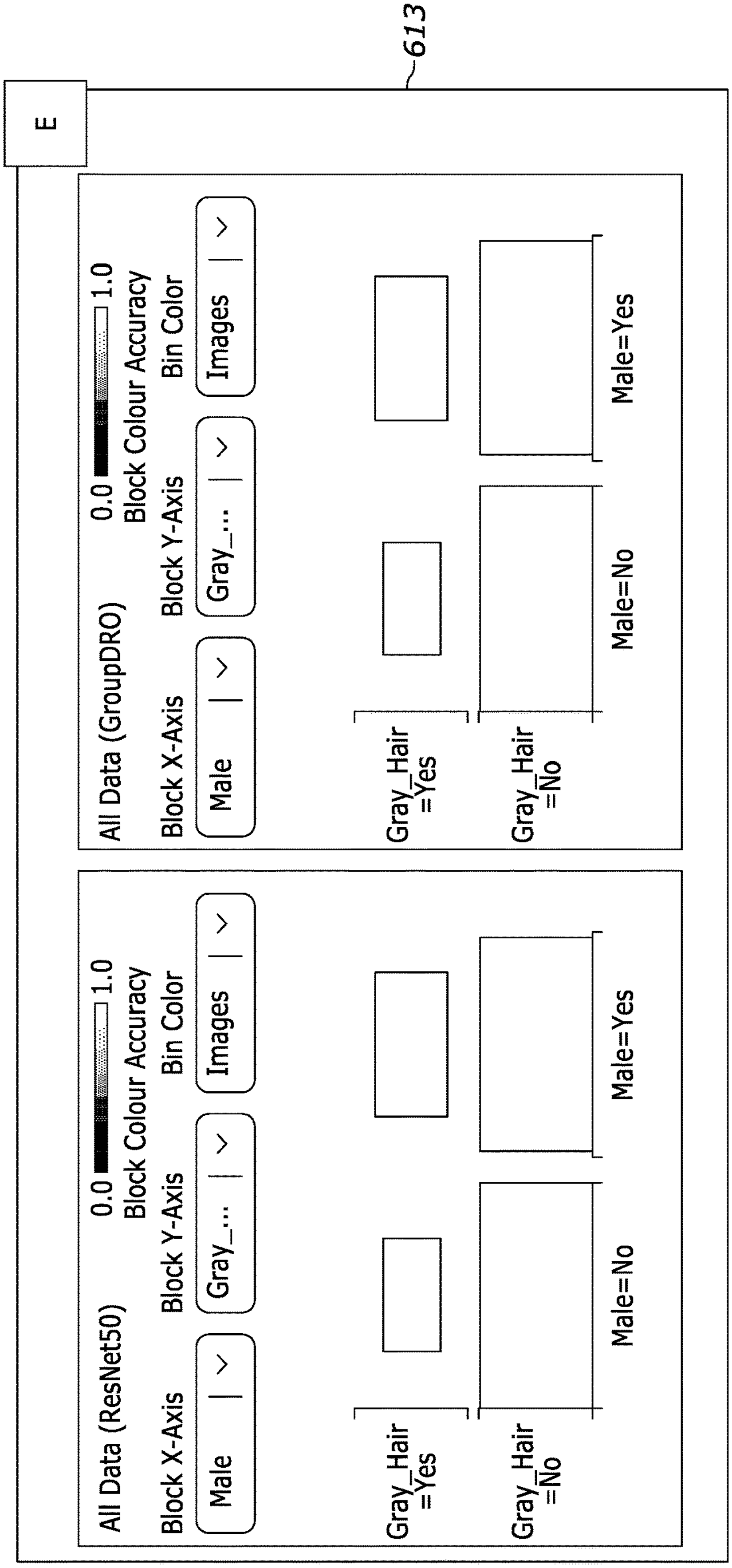

FIG. 6 illustrates an embodiment of an interface with an ability to output attributes associated with various slices of an input data. Thus, FIG. 6 shows an example of the visualization design of a system sometimes referred to as "SliceTeller". The interface may be a graphical user interface 600. The main visualization components of SliceTeller may be a slice marix 601. The slice matrix may show the data slices. The data slices may be represented in rows in one aspect. The slice matrix 601 may include a slice description that is shown in colums (e.g., encoded in columns). The slice metrics, such as support and accuracy, may also be shown for each data slice. The slice matrix 601 may thus show a summary of all the data slices with a performance metric that diverges from the overall model. The user can drill down on the slices in order to explore one or more data slices simultaneously using the Slice Detail View.

Users may be able to explore the data slices in order to understand them and value how critical they are. The system should allow the user to explore the data, model metrics, and distributions to explain these scenarios. In critical applications, experts may need to trade-off the performance of certain scenarios in order to focus on critical use cases. To do so, the experts may need to train models from scratch, which can be very time-consuming. The system should enable the quick experimentation with the slice-based model optimization, highlighting possible trade-offs in the data.

The interface may use a slice-based model comparison. As such, users may need to train and evaluate multiple models in order to tune parameters and mitigate problems. However, this comparison may be done at the aggregated level (e.g., a single metric value). The system should allow the comparison of model performances at the slice level, facilitating the identification of trade-offs between data slices.

Thus, Slice Matrix 601 may provide an overview of the problematic data slices to the user. First, the data slices may be identified using DivExplorer or another tool for analyzing datasets and finding subgroups of data where a classifier behaves differently than on the overall data. After the data slices are found, they are graphically represented using slice matrix 601, an adaptation of the UpSet matrix encoding, where sets are represented as rows, and set members, as columns. In the context of data slices, the system may use a similar encoding where each slice is represented as a row (set), and slice descriptions (items), as columns. Our adaptation also includes data slice metrics on the UpSet visualization encoding.

Model and data metrics are computed and displayed together with their respective slices. For model-agnostic metrics, a bar chart is displayed and, for model-specific metrics, a color-coded 1-D scatter plot may be shown. In FIG. 6, the metrics "Support" and "Accuracy" may be displayed. The system may also show a truncated scale for "Support", since the support of the entire dataset (slice "All Data") may be equal to 1. Additional metrics can be defined, including "Precision", "Recall", and "F1 Score" may be displayed. The VA system disclosed in the current embodiment may allow a detailed model comparison using automatically computed data slices to guide the analysis process. The system may have various detail views related to the slices that can cater to different data types. One may include a slice distribution view, that shows a bar graph associated with every data slice. The other may include a matrix scape view, such as that shown in view 609 and view 613.

The accuracy view 605 may also be included in the interface 600. The accuracy view 605 may show an accuracy comparison between two models (e.g., ResNet50 and GroupDRO). Thus, the system may understand how each model may impact each slice. Furthermore, the accuracy view 605 may show a comparison of a same model with different weights, rather than different models.

At 607, the system may include a sliced distribution view. The slice distribution view may allow users to select the metadata to understand the distribution shifts across slices. The interface may present the distribution of each metadata feature as a sorted histogram and align those for the same feature of different slices to facilitate a more convenient comparison. For example at 607, two data slices may be selected ("All Data" and "Slice 1") and "Object" metadata distribution is shown.

The interface 600 may include a detail view 609. The detail view 609 may include an option to show contextualize images with metadata information. It may be useful to allow a user the option to explore images themselves. In particular, an option to check whether they could identify potential sources for model mistakes in samples may be beneficial.

The system menu 611 may include options for model selection. The system menu may allow users to switch between data slices from the multiple ML models, summarize model slices, and perform "what if" analyses to estimate the effect of optimizing the model for a particular data slice. For example, the system menu 611 may include effect estimation of focusing on a slice during model training, and data slice summarization.

The matrix scape visualization 613 may contain a comparison of two data slices. The matrix scape visualization 613 may contain information comparing all data for a particular model (e.g., ResNet50) compared to all data for another model (GroupDRO). The view may include accuracy information about the data slice. The system may utilize a visualization option or view that can contextualize images with metadata information. In such a view, images can be laid out in a canvas according to different metrics and aggregated at multiple levels of detail. At the coarsest aggregation level, the view may also show a heat-map of a particular data metric (for example, accuracy), grouped by meta features chosen by the user as shown in view 613. Upon zooming in, users can see individual data samples as well, as shown in view option 609.

Figure 7:
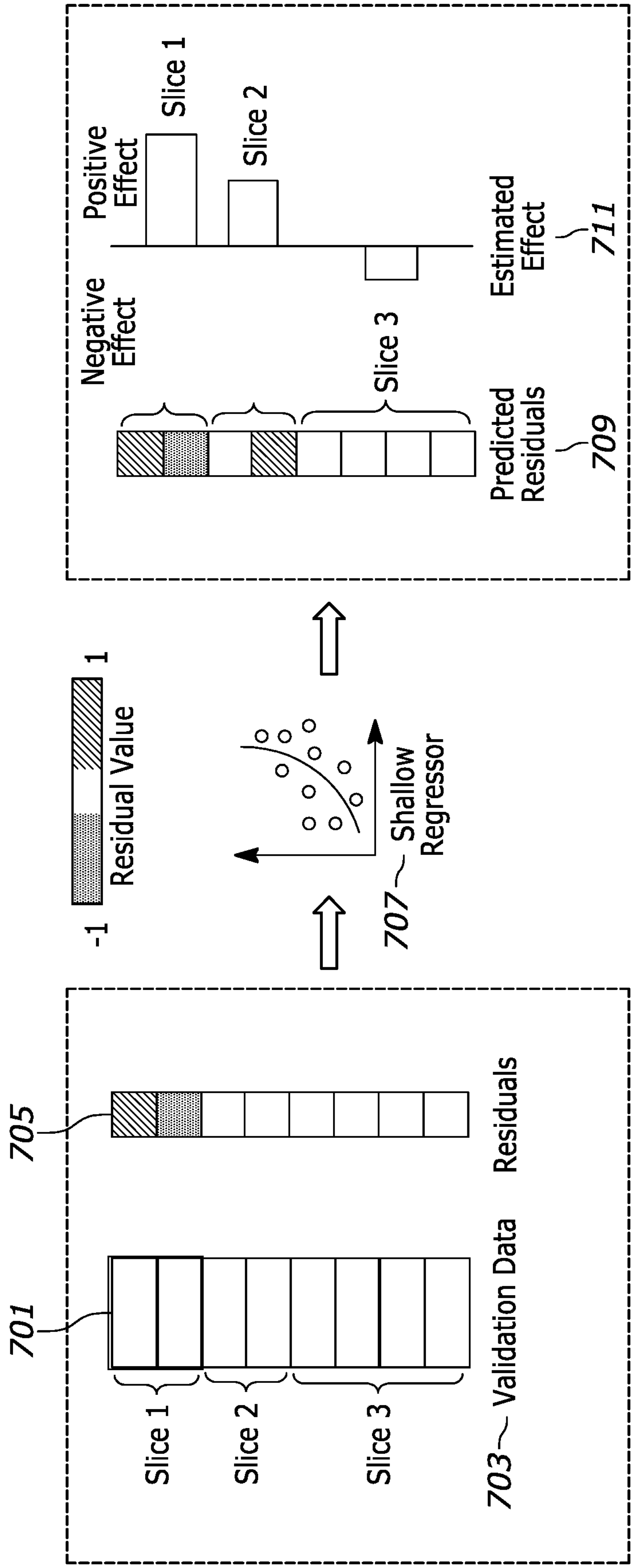
FIG. 7 illustrates an embodiment of a flow chart of an algorithm to estimate model optimization.

FIG. 7 is an illustrative example of a flow chart of an algorithm to estimate model optimization. Given a selected slice 701 (e.g. slice 1) from validation data 703, the system may train a shallow regressor 707 to estimate that, under the ideal scenario where the optimization model correctly fits to slice 1 701 and how the effects of the other slices (e.g. slice 2 and 3) will be affected for optimizing that slice. Thus, the system may allow an expert to focus on a critical slice and optimize that slices performance to understand the effects of other slices, as the other slices may be negatively impacted. The prediction target of the regressor is designed as the residuals of the original model predictions to the ground truth validation labels. To focus on the effect estimation of slice 1, the system may set the residual values for only a selected slice 701 (e.g., 701) of the validation data 703, but keep the residuals of all other slices as 0. The predicted residuals 709 from the regression are in the range of [−1, 1]. The system may then aggregate the sample-level residual predictions to obtain slice-level estimation results, and how will the accuracy on the slices increase or decrease.

The system may be able to create multiple models and evaluate trade-offs between them from the perspective of manually created data slices (e.g., slice 1, slice 2, slice 3, etc.) from the validation data 703. Denote the original input model to SliceTeller as f parameterized by 0. The system and method may allow the training data be $X^{train} \in R^{Ntrain\ xD}$, where $N^{train}$ is the number of samples in training set and D is the feature dimension. Similarly, let the validation data be $X^{val} \in R^{Nval\ XD}$. The system may use $S^{val}$ to denote the slices selected by user (as explained above), and $S^{train}$ to denote the training data slices that correspond to the same description as $S^{val}$ (e.g., Weather=Sunny, Object=Wall). The system can utilize the optimization approaches (discussed in detail below) to retrain f on $X^{train}$ to prioritize on $S^{train}$, in order to obtain the optimized model f'. However, due to the scale of $X^{train}$ and the high complexity of f, the optimization may be time-consuming. It is therefore very difficult to try out different slice combinations to obtain the optimal f' that could satisfy the product requirements.

To facilitate fast slice-based experimentation, it may be a system objective to estimate the performance difference between f' and f without explicitly training for f'. Thus, the system may utilize an algorithm (e.g. "SliceBoosting algorithm") to perform the estimation. Thus, instead of training the full model to evaluate slice trade-offs, the system can train a shallow model, such as a gradient boosting with shallow decision trees, to approximate the residuals (errors) of the slices, in an approach similar to boosting. The shallow model may be denoted as h. Due to the shallowness, the training process may be significantly faster than training the full model from scratch. The shallow model consists of multiple shallow decision trees, which may be very fast to train. The model may be shallow because the decision trees that include it are shallow.

The system may, in an illustrative example, have two assumptions: First, the validation set $X^{val}$ may have a similar distribution to the training data $X^{train}$ while being significantly smaller. This may allow the system to train the shallow model on the validation set to approximate the full model behavior on the training set. This assumption is valid in most cross-validation experiment settings. The second assumption may be that the optimization approach (as discussed in detail below) may be sufficiently powerful to steer the model to make correct predictions on the selected validation slices. Under these assumptions, the system may train the shallow model to fit to the selected validation slices $S^{val}$ together with the associated labels. After it is trained, its predictions on other slices will contain the approximation of the full model's behavior with further optimization.

Since the shallow model may be considered a "weak learner", it may be challenging to encode all validation data and labels. Inspired by gradient boosting and surrogate model explanation approaches, the design of the shallow model may be such that to instead fit to the residuals (errors) of the original model on the selected slices. Since the original model is powerful (e.g., ResNet-50 Deep Neural Networks), its prediction is close to ground truth labels. Therefore, predicting the residual is a significantly easier task for the shallow model. As shown in FIG. 7, the residual is calculated as the difference between the ground truth validation labels and the predicted labels, in one-hot-encoded format:

$$\text{residual}_i = y_i^{val} - \hat{y}_i^{val} \quad \text{(Equation 1)}$$

Where $$y_i^{val}$$

denotes the one-hot-encoded ground truth validation label for sample $$x_i^{val}$$

and $$\hat{y}_i^{val}$$

denotes the one-hot-encoded predicted label from the original model f. As shown in FIG. 7, the system may illustrate the residual for a certain class. There are three possible values in the residuals calculated from Eq. (1): 0 denoting the model prediction is correct, 1 denoting the model missed the detection of the class, and −1 denoting the model wrongly predicted the class. Note that since the system may focus on the selected slices, samples from all other slices have residual of 0.

The system may then train the shallow regressor h (e.g., shallow regressor 707) using XGBoost or a similar distributed gradient boosting framework to learn the residuals from $S^{val}$. To achieve fast response for visual interaction, the system may use only 3 training iterations and maximum tree height 5 in XGBoost (these parameters can be fine-tuned depending on the problem) in one example. To emphasize on the small set of misclassified samples, the system may increase their weights in the loss function. After h is trained, the system may infer the residual and prediction label for the full optimized model $$(\hat{y}_j^{val})$$

as follows:

$$\text{pred\_residual}_j = h(x_j^{val})$$

$$\hat{y}_j^{val} = \text{pred\_residual}_j + \hat{y}_j^{val}$$

$$x_j^{val}$$

contains data features of the validation set belonging to Slice j. A good estimation is achieved if $$\hat{y}_j^{val}$$

is close to the true label $y_j$. After obtaining all estimated predictions, the system may measure the new accuracy in each slice and compare it with the original model accuracy to determine final estimated effect 603. More specifically, let A be the vector containing the accuracy of the original model on all data slices, and A' be the vector containing the accuracy of the boosted model f' on all data slices. The estimated effect E' is given by E'=A'−A. As illustrated in FIG. 7, in the estimation effect, a positive number indicates that the performance on the slice might improve with model optimization. On the other hand, a negative number suggests that the performance on the slice could be reduced.

In order to evaluate the network algorithm and associated performance (e.g. "SliceBoosting"), the system can check whether its estimated effects agree with the real optimized model performance, as discussed further below. The system may measure this Agreement Score using Pearson correlation coefficient, or any other type of measurement of linear correlation between two sets of data of use cases. More specifically, let A be the original model accuracy on all data slices and A" be the retrained model accuracy on all data slices. The real performance effect E is given by E'=A"−A. The system may compute the Pearson correlation coefficient between the estimated effect E' and the real effect E as:

$$\text{Agreement Score}=\text{corr}(E,E^1)$$

In such uses cases, the system's Agreement Score was greater than 0.8, showing high correlation between the estimated slice optimization effects and the real effects. The system may further validate the network (e.g., utilizing a SliceBoosting algorithm) by evaluating the Agreement Score of ten estimated effects, computed for the top five worst data slices of the two aforementioned use cases (a new estimate and model are computed for each data slice). In one use case, the estimates for five models optimized on the five worst slices had an Agreement Score of 0.860±0.050. In another use case, the estimates for five models optimized on the five worst slices had an Agreement Score of 0.776±0.054.

The system may also utilize state-of-the-art model optimization methods to improve the performance on the selected slices, while minimizing the trade-off for the averaged model performance on the entire dataset. These methods may adapt the loss function based on identified slice prioritization and subsequently perform additional training to steer the model towards the user requirement. Note that the framework may be compatible with data-centric model improvement strategies as well (e.g., additional data collection and data augmentation/synthesis). The system may allow for optimization based model improvements without any change of the dataset.

During re-training, the system may prioritize slices in the training data according to a user's decision. The model optimization methods of the network (for example, in a visual interface like SliceTeller, e.g. importance weighting and group DRO). Note that the system may merge all unselected slices into a single slice for optimization. In general, importance weighting method changes the loss function by assigning heavier weights to the training samples in the worst-performing slices. On the other hand, group DRO prioritizes the worst-performing slices during the training process.

The system may focus on importance weighting. Importance weighting modifies the expected loss by emphasizing training samples belonging to the slices $S^{train}$. The system may denote the number of samples in $S^{train}$ as $n^{train}$, the number of samples in the training set as $N^{train}$, and the total number of slices as M. The weight for slice S is calculated as:

$$W_{S^{train}} = \frac{N^{train}}{M \times n^{train}}$$

Intuitively, the selected slices may lower performance correspond to the minority groups in training set. The system can therefore specify the weights of the slices as inverse proportional to the respective slice size. Then, the modified expected loss can be defined as follows:

$$\mathbb{E}_{(x^{train},y^{train})} \sim P_{S^{train}}[l(\theta;(x^{train},y^{train}))]$$

where P is the distribution of training data $X^{train}$ and l is the loss.

The system may also utilize group distributional robust optimization (DRO). Compared to importance weighting that up weights the selected slices by heuristic rule, group DRO may adopt a different optimization scheme. Instead of optimizing for the averaged loss over entire training data, the utilization of group DRO may optimize for the worst-case loss over the groups in the training data. Specifically, the expected loss is defined as:

$$\max_{S^{train}} \mathbb{E}(x^{train}, y^{train}) \sim P_{train}\left[l\left(\theta; \left(x^{train}, y^{train}\right)\right)\right]$$

During training, the optimization can be conducted by either recording the historical losses of all groups, or utilizing gradient ascent.

Thus, the visual analytics framework ("VA") system may data slice-driven validation of ML models. Such a tool may allow users to quickly identify problematic data slices, investigate the failure cases, understand the potential optimization trade-offs, and eventually iterate on new model solutions.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A computer-implemented method for a machine-learning network, comprising:

receiving an input dataset, wherein the input dataset is indicative of image information, tabular information, radar information, sonar information, or sound information;

sending the input dataset to a first machine-learning model configured to output predictions associated with the input data;

identifying, utilizing the first machine-learning model, one or more slices associated with the input dataset and a first machine learning model in a first iteration, wherein each of the one or more slices include input data from the input dataset and common attributes associated with each slice;

upon selecting one or more slices of the input dataset, training a shallow regressor model configured to predict residuals associated with the first machine learning model;

creating a first one-hot-encoded representation associated with a ground-truth label and a second one-hot-encoded representation associated with a model prediction associated with each sample associated with each of the one or more slices;

determining residuals associated with every model prediction of the first machine learning model, wherein the residuals are an element-wise difference between the first one-hot-encoded representation associated with the ground truth label and the second one-hot-encoded representation associated with the model prediction;

training the shallow regressor model to compute one or more predicted residuals of the selected slices utilizing validation data associated with the input dataset and residuals;

generating an optimized model configured to output optimized predictions of the first machine-learning model utilizing the predicted residuals, wherein the optimized model is generated by adding the original model predictions and the predicted residuals;

determining a modified accuracy of optimized predictions from the optimized model on each of the one or more slices of the input dataset;

determining a modified effect of each of the one or more slices by utilizing a difference between the modified accuracy and an original accuracy associated with the first machine learning model; and outputting the modified effect to a graphical interface.

2. The computer-implemented method of claim 1, wherein the first machine learning model has different weights than the optimized model.

3. The computer-implemented method of claim 1, wherein the first machine learning model is a different network than the optimized model.

4. The computer-implemented method of claim 1, wherein the residual associated with an iteration is defined as follows $$\text{residual}_i = y_i^{val} - \hat{y}_i^{val},$$

wherein e $$y_i^{val}$$

is the first one-hot-encoded representation associated with the ground truth label and $$\hat{y}_i^{val}$$

is the second one-hot-encoded representation associated with the model prediction.

5. The computer-implemented method of claim 4, wherein the $\text{residual}_i$ is either 0 denoting a correct prediction, 1 denoting a missing detection of a class, or −1 denoting an incorrect class.

6. The computer-implemented method of claim 1, wherein the sample includes an image or observation associated with the one or more slices.

7. The computer-implemented method of claim 1, wherein the validation data includes metadata and ground truth labels.

8. The computer-implemented method of claim 1, wherein the identifying of one or more slices includes utilizing a data slice finding algorithm to identify the one or more slices.

9. The computer-implemented method of claim 1, wherein the shallow regressor is trained utilizing a gradient boosting framework.

10. A system, comprising:

a processor in communication with an interface, wherein the processor is programmed to:

receive an input dataset from the interface, wherein the input dataset is indicative of image information, tabular information, radar information, sonar information, or sound information;

send the input dataset to a first machine-learning model configured to output predictions associated with the input data;

identify, utilizing the first machine-learning model, one or more slices associated with the input dataset and a first machine learning model in a first iteration, wherein each of the one or more slices include input data from the input dataset and common attributes associated with each slice;

upon selecting one or more slices of the input dataset, train a shallow regressor model to predict residuals associated with the first machine learning model;

create a first one-hot-encoded representation associated with a ground-truth label and a second one-hot-encoded representation associated with a model prediction associated with each sample associated with each of the one or more slices;

determine residuals associated with every model prediction of the first machine learning model, wherein the residuals are an element-wise difference between the first one-hot-encoded representation associated with the ground truth label and the second one-hot-encoded representation associated with the model prediction;

train the shallow regressor model to compute a predicted residual of the selected slices utilizing validation data associated with the input dataset and residuals;

optimize original model predictions of the first machine-learning model utilizing the predicted residuals, wherein the optimizing is done by adding the original model predictions and the predicted residuals;

determine an edited accuracy of optimized predictions from the optimized model on each of the one or more slices of the input dataset;

determine an estimated effect of each of the one or more slices by utilizing a difference between the edited accuracy and an original accuracy associated with the first machine learning model; and output the estimated effect to a graphical interface.

11. The system of claim 10, wherein the sample includes an image or observation associated with the one or more slices.

12. The system of claim 10, wherein the identifying of one or more slices includes utilizing a data slice finding algorithm to identify the one or more slices.

13. The system of claim 10, wherein the shallow regressor is trained utilizing a gradient boosting framework.

14. The system of claim 10, wherein the residual is either 0 denoting a correct prediction, 1 denoting a missing detection of a class, or −1 denoting an incorrect class.

15. A computer-implemented method for a machine-learning network, comprising:

receiving an input dataset, wherein the input dataset is indicative of image information, tabular information, radar information, sonar information, or sound information;

sending the input dataset to a first machine-learning model to output predictions associated with the input data;

identifying one or more slices associated with the input dataset and a first machine learning model in a first iteration, wherein each of the one or more slices include input data from the input dataset and common attributes associated with each slice;

upon selecting one or more slices of the input dataset, training a shallow regressor model configured to predict residuals associated with the first machine learning model;

create a first one-hot-encoded representation associated with a ground-truth label and a second one-hot-encoded representation associated with a model prediction associated with each sample associated with each of the one or more slices;

determine residuals associated with every model prediction of the first machine learning model, wherein the residuals are an element-wise difference between the first one-hot-encoded representation associated with the ground truth label and the second one-hot-encoded representation associated with the model prediction;

training the shallow regressor to compute a predicted residual of the selected slices utilizing validation data associated with the input dataset and residuals;

optimize original model predictions of the first machine-learning model utilizing the predicted residuals, wherein the optimizing is done by adding the original model predictions and the predicted residuals;

determine an edited accuracy of optimized predictions from the optimized model on each of the one or more slices of the input dataset; and output an estimated effect to a graphical interface, wherein the estimated effect is associated with one or more slices by utilizing a difference between the edited accuracy and an original accuracy associated with the first machine learning model.

16. The computer-implemented method of claim 15, wherein the first machine learning model has different weights than the optimized model.

17. The computer-implemented method of claim 15, wherein the first machine learning model is a different network than the optimized model.

18. The computer-implemented method of claim 15, wherein the graphical interface includes information indicative of the edited accuracy and the original accuracy.

19. The computer-implemented method of claim 15, wherein the shallow regressor is trained utilizing a gradient boosting framework.

20. The computer-implemented method of claim 15, wherein the residual associated with an iteration is defined as follows:

$$\text{residual}_i = y_i^{val} - \hat{y}_i^{val}.$$

* * * * *